United States Patent [19]

Bates et al.

[11] Patent Number: 5,592,851
[45] Date of Patent: Jan. 14, 1997

[54] SEMI-AUTOMATIC MECHANICAL TRANSMISSION WITH FORCED AUTOMATIC SHIFTING

[75] Inventors: Ian R. J. Bates, W. Yorkshire; Michael Daly, London; Paul M. Fowler, Lymm, all of England

[73] Assignee: Eaton Corporation, Cleveland, Ohio

[21] Appl. No.: 551,603

[22] Filed: Nov. 1, 1995

[30] Foreign Application Priority Data

Nov. 11, 1994 [GB] United Kingdom .................. 9422850

[51] Int. Cl.$^6$ .................................................. F16H 61/00
[52] U.S. Cl. ........................ 74/336 R; 477/108; 477/134
[58] Field of Search .............................. 74/335, 336 R; 477/78, 108, 80, 134, 137, 142

[56] References Cited

U.S. PATENT DOCUMENTS

| 4,648,290 | 3/1987 | Dunkley et al. | 74/866 |
| 4,697,478 | 10/1987 | Mastumoto et al. | 477/108 |
| 4,716,872 | 1/1988 | Pol | 477/108 X |
| 4,735,109 | 4/1988 | Richards et al. | 74/745 |
| 4,754,665 | 7/1988 | Vandervoort | 74/745 |
| 4,841,447 | 6/1989 | Hayashi | 364/431.01 |
| 4,930,078 | 5/1990 | Dunkley et al. | 364/424.1 |
| 4,930,081 | 5/1990 | Dunkley et al. | 364/424.1 |
| 4,938,604 | 7/1990 | Naito et al. | 477/108 X |
| 5,012,419 | 4/1991 | Yamamoto | 477/108 X |
| 5,051,905 | 9/1991 | Yoshida | 477/108 X |
| 5,074,371 | 12/1991 | Shibayama | 477/108 X |
| 5,081,588 | 1/1992 | Holmes et al. | 364/424.1 |
| 5,119,899 | 6/1992 | Johnson et al. | 477/108 X |
| 5,155,682 | 10/1992 | Ninoyu | 477/108 X |
| 5,441,463 | 8/1995 | Steeby | 74/336 R |
| 5,487,004 | 1/1996 | Amsallen | 477/127 X |

Primary Examiner—Charles A. Marmor
Assistant Examiner—Peter Kwon
Attorney, Agent, or Firm—Howard D. Gordon

[57] ABSTRACT

A control system and method for an automated mechanical transmission system (310) operable in a hold mode of operation (H) is provided. When operating in the hold mode of operation, if override conditions ($ES>ES_{MAX}$, $ES<ES_{MIN}$, cruise control resume mode) are sensed, the hold mode is overridden and a shift from the currently engaged gear ratio ($GR_C$) into a desirable gear ratio ($GR_D$) is automatically initiated.

10 Claims, 4 Drawing Sheets

SEMI-AUTOMATIC MECHANICAL TRANSMISSION WITH FORCED AUTOMATIC SHIFTING

BACKGROUND OF THE INVENTION

1. Related Applications

This application is related to published European Patent Application No. 0585020A3, titled START GEAR RATIO CONTROL SYSTEM AND METHOD, which claims priority from U.S. patent application Ser. No. 07/935,937, now, issued U.S. Pat. No. 5,506,771, EATON CORPORATION, as this application.

FIELD OF THE INVENTION

The present invention relates to a control system and method for an automated mechanical transmission system, including a manually operated shift selector, for at least partially automatically controlling the changing or shifting of transmission gear ratios on a vehicle, while leaving the vehicle driver or operator some residual measure of control. In particular, the present invention relates to a control system and method for the at least partially automatic control of a mechanical change-gear transmission system having a mode of operation for at least partially automatically executing allowable driver-selected transmission ratio shifts. More particularly, the present invention relates to a system and method for controlling an at least partially automated mechanical transmission system having a mode of operation wherein automatic shift execution from the currently engaged ratio ($GR_C$) into a target gear ratio ($GR_T$) requires manual selection by the operator and further including means to sense predetermined override conditions which result in forced automatic shifting of the transmission. By way of example, such override conditions may include engine speed (ES) being less than a minimum reference value ($ES_{MIN}$), engine speed exceeding a maximum reference value ($ES_{MAX}$) and/or operation in the cruise control "recovery mode."

DESCRIPTION OF THE PRIOR ART

Fully automatic mechanical transmission systems, usually associated with heavy-duty vehicles such as heavy-duty trucks and/or coaches, that sense throttle positions, vehicle speeds, engine speeds and the like, and automatically shift the vehicle transmission in accordance therewith, are well known in the prior art. Such automated mechanical transmission systems typically include a multiple-speed mechanical transmission driven by an internal combustion engine through a non-positive coupling and utilize electronic, hydraulic and/or pneumatic logic and actuators to engage and disengage mechanical (i.e., positive) clutches to achieve a desired gear ratio. Examples of such transmissions may be seen by reference to U.S. Pat. Nos. 3,961,546; 4,081,065; 4,361,060; 5,050,079 and 5,109,729, the disclosures of which are hereby incorporated by reference.

It is known to provide a semi-automatic mechanical transmission control wherein automatic changing between a plurality of gear ratios is provided while normally permitting the driver to choose when to make a particular gear ratio change and whether to select the immediately consecutive ratio up or down or to skip one or more ratios. Furthermore, the semi-automatic control system prohibits engagement of a driver selected higher ratio (i.e., an upshift) that would cause the engine speed to decrease below the idle speed (i.e., would cause stalling and/or overstressing at low speeds of the engine) and of a lower ratio (i.e., a downshift) if such a change would cause overspeeding of the engine. Examples of such a semi-automatic transmission control can be seen by reference to U.S. Pat. Nos. 4,648,290; 4,800,360; 4,930,081 and 4,930,078, the disclosures of which are incorporated herein by reference, and to aforementioned published European Patent Application No. 0585020A3.

Similarly, it is known to provide partially or fully automated mechanical transmission systems having a "hold" or "H" mode of operation wherein the transmission was maintained (or held) on its existing currently engaged ratio, with shifts therefrom requiring manual operator selection by an up/down selector. Examples of these types of transmission systems may be seen by reference to U.S. Pat. Nos. 4,690,008; 5,274,553 and 5,323,669, and to European Patent No. 602685A, the disclosures of which are incorporated herein by reference.

The aforementioned modes of operation were not totally satisfactory, as under certain vehicle operation conditions, allowing the transmission to remain in the currently engaged ratio was undesirable.

SUMMARY OF THE INVENTION

In accordance with the present invention, the drawbacks of the prior art are overcome or minimized by the provision of a control system and method for transmissions operating in a mode of operation requiring manual selection of an automatic shift implementation wherein, under certain predetermined operating conditions, shifts from the currently engaged ratio are automatically initiated and implemented.

It has been found, in situations in which the vehicle is operated in the "hold" mode and engine speed falls outside of an acceptable range and/or when recovering to selected higher speed in a cruise control mode, undesirable vehicle operation is avoided by forcing automatic shift initiation and implementation.

Accordingly, it is an object of the present invention to provide a new and improved control system/method for at least partially automated mechanical transmission systems operating in the "hold" mode which, upon sensing predetermined conditions, will force automatic shift initiation and implementation.

This and other objects and advantages of the present invention will become apparent from a reading of the following description of the preferred embodiments taken in connection with the attached drawings.

BRIEF DESCRIPTION OF THE DRAWINGS

FIGS. 3, 3A AND 3B are schematic illustrations of an alternate semi-automated mechanical transmission system advantageously utilizing the present invention.

DESCRIPTION OF THE PREFERRED EMBODIMENT

Certain terminology will be used in the following description for convenience in reference only and will not be limiting. The term "compound transmission" is used to designate a change speed or change-gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section (i.e., that set of gears having the highest ratio of reduction relative to the input shaft of the transmission).

The term "automatic shift initiation" is intended to apply to initiation of fully automatic shifts as seen in above-mentioned U.S. Pat. Nos. 4,361,060 and 5,109,721, and to automatic preselection of a shift and/or issuing of a shift prompt as seen in above-mentioned U.S. Pat. Nos. 5,053,961 and 5,053,962. Automatic shift initiation does not require manual initiation by the vehicle operator.

Signals indicative of engine speed will include signals from engine speed sensors, signals from input shaft speed sensors, and signals such as output shaft and gear ratio signals which may be used to calculate (ES=IS=OS*GR) and/or estimate engine speed.

Figure 1:
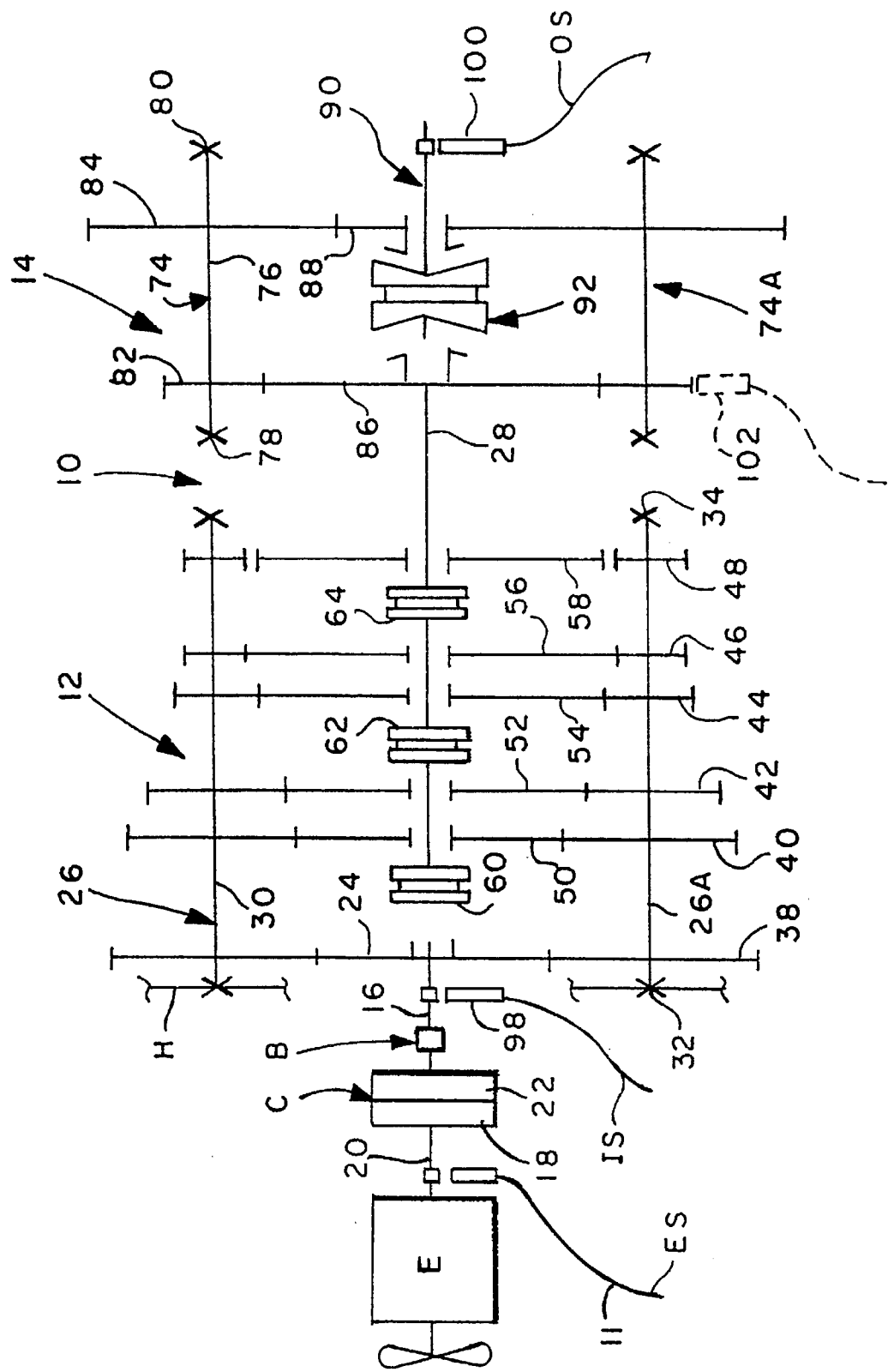
FIG. 1 is a schematic illustration of an automated vehicular mechanical transmission system advantageously utilizing the present invention.

Referring to FIG. 1, a range-type compound transmission 10 of the type partially automated by the semi-automatic mechanical transmission system of the present invention is illustrated. Compound transmission 10 comprises a multiple speed main transmission section 12 connected in series with a range-type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled by a manually or automatically controlled throttle device (not shown) and the master clutch C is manually controlled by a clutch pedal (not shown) or automatically controlled by a clutch actuator, or the like. An input shaft brake B, usually operated by overtravel of the clutch pedal, is preferably provided to provide quicker upshifting as is well known in the prior art.

Transmissions similar to compound mechanical transmission 10 are well known in the prior art and may be appreciated by reference to U.S. Pat. Nos. 3,105,395; 3,283,613; 4,735,109 and 4,754,665, the disclosures of which are incorporated herein by reference. A sensor 11 may be provided for sensing the rotational speed of the engine and providing a signal indicative thereof.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known acting nonsynchronized double acting jaw clutch type.

Shift housing or actuator 70 may be actuated by electric motors or by compressed fluid, such as compressed air, and is of the type automatically controllable by a control unit as may be seen by reference to U.S. Pat. Nos. 4,445,393; 4,555,959; 4,361,060; 4,676,115; 4,873,881 and 4,899,607, the disclosures of which are incorporated herein by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith. Similar transmissions provide 9, 10, 13, 16 or 18 forward speeds as may be seen by reference to U.S. Pat. Nos. 4,754,665 and 4,974,468.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of a shift fork (not shown) and the range section shifting actuator assembly 96, is provided for clutching either gear 86 to mainshaft 28 for low range operation or gear 88 to mainshaft 28 for direct or high range operation of the compound transmission 10.

Range section actuator 96 may be of the type illustrated in U.S. Pat. Nos. 3,648,546; 4,440,037 and 4,614,126, the disclosures of which are hereby incorporated by reference.

Although the range-type auxiliary section 14 is illustrated as a two-speed section utilizing spur or helical-type gearing, it is understood that the present invention is also applicable to simple transmissions and to compound transmissions utilizing splitter or combined splitter/range-type auxiliary sections, having three or more selectable range or splitter ratios and/or utilizing planetary-type gearing. Also, any one or more of clutches 60, 62 or 64 may be of the synchronized jaw clutch type and transmission sections 12 and/or 14 may be of the single countershaft type. Further, the present invention is also applicable to automated transmissions utilizing friction clutches rather than jaw clutches to engage selected ratios.

Figure 2A:
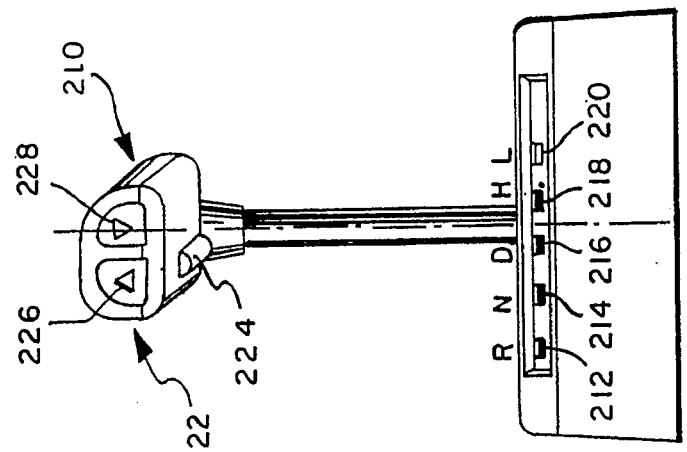
FIG. 2A is an elevational view of the driver control for the automated transmission system of FIG. 2.
Figure 2:
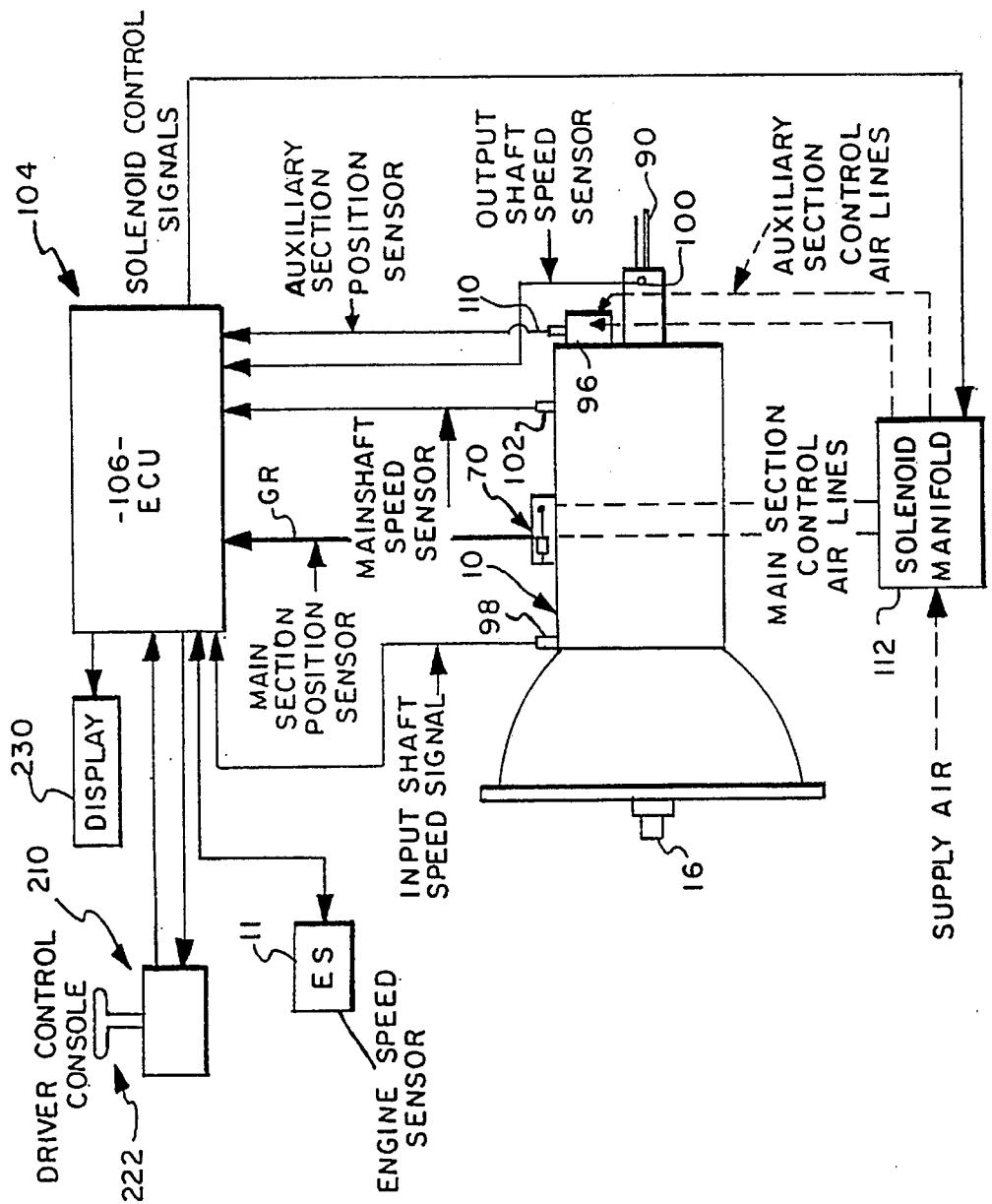
FIG. 2 is a schematic illustration of an automated shift implementation system having a hold mode of operation for a mechanical transmission system advantageously utilizing the present invention.

The semi-automatic shift implementation control system 104 for a mechanical transmission system of the present invention is schematically illustrated in FIG. 2. Control system 104, in addition to the mechanical transmission system 10 described above, includes an electronic control unit 106, preferably microprocessor based, for receiving input signals from the engine speed sensor 11, input shaft speed sensor 98, from the output shaft speed sensor 100 (or, alternatively, the mainshaft speed sensor 102) and from the driver control console 108. The ECU 106 may also receive inputs from an auxiliary section position sensor 110. ECU 106 may communicate with the engine E by means of an electronic data bus such as those conforming to SAE J1922 or J1939 protocols.

The ECU is effective to process the inputs in accordance with predetermined logic rules to issue issue command output signals to a transmission operator, such as solenoid manifold 112 which controls the mainsection section actuator 70 and the auxiliary section actuator 96, and to the driver control console 108. ECU's of this type are well known in the prior art as may be seen by reference to U.S. Pat. No. 4,595,986, the disclosure of which is incorporated herein by reference.

The driver control and display console allows the operator to select a manual or hold mode of operation for manually selecting a shift in a given direction (i.e., upshifts or downshifts) or to neutral from the currently engaged ratio, or to select a semi-automatic preselect mode of operation, and preferably provides a display 230 for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

The control console 210 is illustrated in FIG. 2A. Briefly, a mode selector 210 is utilized to select reverse (R) 212, neutral (N) 214, drive (automatic) (D) 216, hold (manual) (H) 218 and low (L) 220. The mode selector includes a handle 222 having a reverse interlock release button 224 and upshift 226 and downshift 228 selection buttons. Other types of controls, such as controls utilizing pushbuttons and/or joy sticks, may also be utilized.

To implement a selected shift, the manifold 112 is preselected to cause actuator 70 to be biased to shift main transmission section 12 into neutral. This is accomplished by the operator causing a torque break or reversal by manually momentarily decreasing and/or increasing the supply of fuel to the engine and/or manually disengaging the master clutch C. As the transmission is shifted into neutral, neutral is verified by the ECU (neutral sensed for a period of time such as 1.5 seconds). If the selected shift is a compound shift (i.e., a shift of both the main section 12 and of the range section 14, such as a shift from 4th to 5th speeds as seen in FIG. 1), the ECU will issue issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged, which will result in an acceptably synchronous engagement of the ratio to be engaged. As the operator, or a control unit, by fuel manipulation and/or use of the input shaft brake, causes the input shaft speed to fall within the acceptable range, the ECU 106 will issue command output signals to manifold 112 to cause actuator 70 to engage the mainsection ratio to be engaged.

In the control algorithms, the issuing of command output signals for engagement of a target gear is dependent upon the transmission (i.e., the input shaft) being manually brought to within an acceptable synchronous point. This synchronous point is usually a range of RPMs (error band) centered about an error of zero RPM (i.e., when input shaft speed equals the product of output shaft speed times the numerical value of the target gear ratio, IS=OS*GRT). When the control electronics sense that the input shaft speed falls within the error band it will fire the solenoid of manifold 112 that will cause the target gear to be engaged. The error bands are selected to give the best shift quality for each gear ratio. These error bands are usually stored in software in the form of tables that are indexed as a function of target gear. When these tables are set up for best shift quality the bands must be made small to minimize "clunking" as the target gear is engaged. With small error bands it is more difficult for the driver to bring the transmission to the correct synchronous point and he may miss it altogether and end up in neutral.

Above-mentioned U.S. Pat. No. 5,063,511 provided a missed shift recovery algorithm that will access a second set of tables a short time after neutral has been sensed (one second). In a normal shift, one second is ample time for the driver to have brought the transmission to the synchronous point. If the neutral state has existed for more than the allowed time the algorithms will assume the driver has missed the shift and call for the new set of tables. This second set of tables will open the error bands to allow for a harsher shift which enhances the probability that the driver's efforts will result in engagement of the target gear instead of remaining in a neutral state.

In the automatic preselection mode of operation, selected by moving selector 210 to the "D" position, the ECU will, based upon stored logic rules, currently engaged ratio (which may be position sensed and/or calculated by comparing input shaft to output shaft speed) and output shaft speed, determine if an upshift or a downshift is required and preselect same.

In the "hold" mode of operation, selected by moving selector 210 to the "H" position, the ECU normally will not initiate shifts from the currently engaged ratio unless upshifts or downshifts are manually requested by the operator utilizing the upshift 226 and downshift 228 selector buttons.

Although the present invention is described in connection with the partially automated mechanical transmission system illustrated in FIGS. 1, 2 AND 2A, it also is applicable to other types of at least partially automated mechanical transmission systems, such as, for example, the systems illustrated in aforementioned U.S. Pat. Nos. 4,361,060; 4,648,290; 4,690,002; and 4,930,078, and published European Patent Application No. 0585020A3.

Figure 3A:
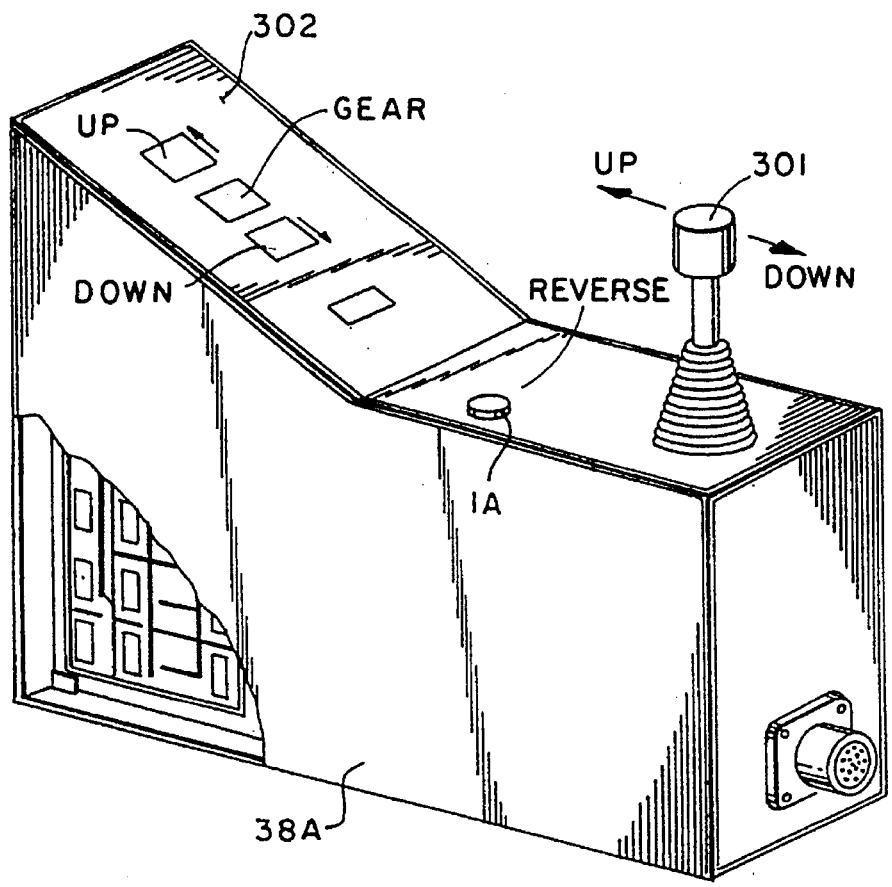
Figure 3B:
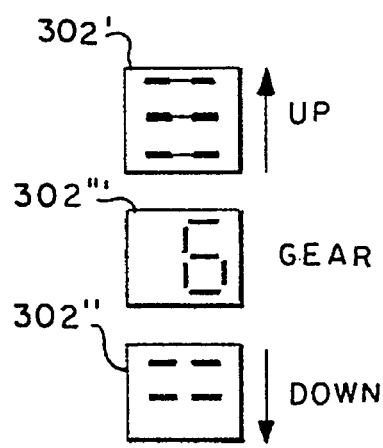

FIGS. 3, 3A AND 3B illustrate a semi-automatic mechanical transmission system 310 utilizing a change-gear transmission 312 having an output shaft 320, an engine 314 and a master friction clutch 316. For quicker shifting, an engine brake 317 and/or input shaft brake 318 may be provided. These drivetrain components are actuated and/or monitored by a fuel controller 326, an engine speed sensor 328, a clutch operator 330, an input shaft speed sensor 332, a transmission operator and position sensor 334, and an output shaft speed sensor 336. These actuators and sensors receive command signals from and/or supply input signals to the system controller 342.

Controller or ECU 342 also receives signals from a throttle position sensor 322 for sensing the position of throttle pedal 324, a brake sensor 304 and a shift selector 301. The controller preferably sends command signals to a display 302. A manual clutch pedal 303 also may be provided for start-from-stop operation.

Systems similar to system 310 may be seen in greater detail by reference to aforementioned U.S. Pat. No. 4,648, 290.

Selector 301 and display 302 may be seen by reference to FIGS. 3A AND 3B. Briefly, selector 301 may be moved one or more times from its centered or "hold" position in either the upshift or downshift direction to select single or skip shifts from the currently engaged ratio, displayed in section 302''' of the display, to an allowable target ratio. Sections 302' and 302" of the display, respectively, indicate the number of allowable higher and lower ratios, respectively, under current vehicle operating conditions.

For system 310 and for the system illustrated in FIGS. 1, 2 AND 2A, when operating in the hold ("H") mode, under previous logic rules, the transmissions 10 and 312, respectively, will remain in the currently engaged ratio absent a shift request by the operator utilizing a manual shift selector (i.e., lever 301 and buttons 226 and 228, respectively).

According to the present invention, it has been determined that under certain vehicle operating conditions, it is desirable to override the usual manual shift initiation requirement of a hold-type operating mode and to force automatic shift initiation and implementation.

One example of such override conditions is when continued vehicle operation in the currently engaged ratio will cause engine speed (ES) to fall outside of a predetermined range defined by an allowable maximum ($ES_{MAX}$) or minimum ($ES_{MIN}$) engine speed. The maximum and minimum values may be set to protect the engine from stalling, lugging and/or overspeeding, to achieve fuel economy, to achieve a desired performance or any other criteria.

Another example of such conditions is operation under the resume mode of cruise control. Suppose the operator has selected cruise control operation at 65 mph (105 kph), is operating in a hold mode in twelfth speed of a 12-forward-speed transmission, slows to 25 mph (40 kph) and then selects "resume" to return to his selected speed. Continuing operation in twelfth speed will cause engine stalling or lugging and unacceptable acceleration to the selected speed. Under these conditions, it is desirable to force an automatic downshift to an acceptable ratio, probably seventh or eighth speed, and then to force upshifts as appropriate until the vehicle has returned to 65 mph (105 kph) operation in twelfth speed.

Other examples of operating conditions wherein the hold mode should be overridden and forced automatic shift initiation should occur, such as maintaining a selected road speed in cruise control when ascending and descending grades, are possible and fall within the scope of the present invention.

Figure 4:
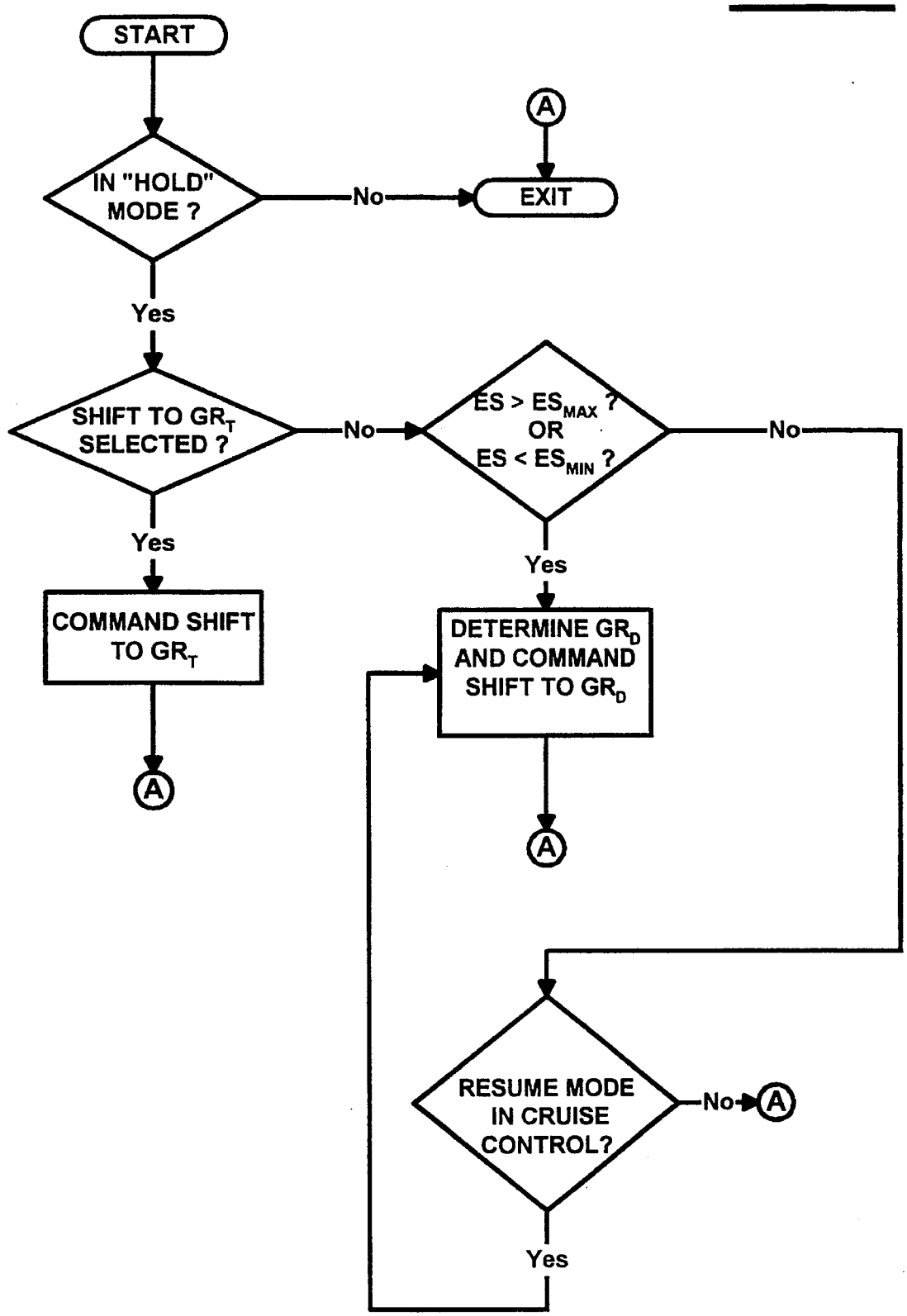
FIG. 4 is a schematic illustration, in flowchart format, of the present invention.

The control system/method of the present invention is schematically illustrated, in flow chart format, in FIG. 4.

Although the present invention has been described with a certain degree of particularity, it is understood that various changes to form and detail may be made without departing from the spirit and the scope of the invention as hereinafter claimed.

We claim:

1. A method of controlling a vehicular automated mechanical change-gear transmission system comprising a fuel throttle-controlled engine (E), a multi-speed change-gear mechanical transmission (10), a manually operated shift selection device (226/228, 301), sensing means for sensing vehicle operating conditions a central processing unit (106) for receiving inputs indicative of vehicle operating conditions and for processing same according to predetermined logic rules to issue command output signals to non-manually controlled operators including a transmission operator (112), said transmission system operable in a hold mode of operation wherein said transmission is retained engaged in a currently engaged ratio ($GR_C$) until a shift from said currently engaged ratio to a target gear ratio ($GR_T$) is manually initiated by use of said selection device, said method comprising:

when operating in said hold mode of operation, sensing for existence of a predetermined override condition, upon sensing the existence of said override condition, determining a desirable gear ratio ($GR_D$) as a function of sensed operating conditions overriding said hold mode of operation and causing an automatic initiation of a shift from said currently engaged ratio to said desirable gear ratio.

2. The method of claim 1 additionally comprising predetermining a maximum desirable engine speed ($ES_{MAX}$) and wherein said inputs include a signal indicative of current engine speed (ES) and said override conditions include current engine speed exceeding said maximum desirable engine speed ($ES > ES_{MAX}$).

3. The method of claim 1 additionally comprising predetermining a minimum desirable engine speed ($ES_{MIN}$) and wherein said inputs include a signal indicative of current engine speed (ES) and said override conditions include current engine speed being less than said minimum desirable engine speed ($ES < ES_{MIN}$).

4. The method of claim 3 additionally comprising predetermining a maximum desirable engine speed ($ES_{MAX}$) and wherein said override conditions additionally include current engine speed exceeding said maximum desirable engine speed ($ES < ES_{MIN}$ or $ES > ES_{MAX}$).

5. The method of claim 1 wherein said vehicle is equipped with a cruise control system having a selectable resume mode of operation for causing the vehicle to return to a preselected road speed, and wherein said override conditions comprising operation of said cruise control system in the resume mode of operation thereof.

6. A system of controlling a vehicular automated mechanical change-gear transmission system comprises a fuel throttle-controlled engine (E), a multi-speed change-gear mechanical transmission (10), a manually operated shift selection device (226/228, 301), means for sensing vehicle operating conditions a central processing unit (106) for receiving inputs indicative of vehicle operating conditions and for processing same according to predetermined logic rules to issue command output signals to non-manually controlled operators including a transmission operator (112), said transmission system operable in a hold mode of operation wherein said transmission is retained engaged in a currently engaged ratio ($GR_C$) until a shift from said currently engaged ratio to a target gear ratio ($GR_T$) is manually initiated by use of said selection device, said system comprising:

said central processing unit includes means effective, when operating in said hold mode of operation, for sensing for existence of a predetermined override condition, and upon sensing the existence of said override condition, determining a desirable gear ratio ($GR_D$) as a function of sensed operating conditions and having the transmission operator override said hold mode of operation and cause an automatic initiation of a shift from said currently engaged ratio to said desirable gear ratio.

7. The system of claim 6 wherein said central processing unit additionally comprises means for predetermining a maximum desirable engine speed ($ES_{MAX}$) and wherein said inputs include a signal indicative of current engine speed (ES) and said override conditions include current engine speed exceeding said maximum desirable engine speed ($ES>ES_{MAX}$).

8. The system of claim 6 wherein said central processing unit additionally comprises means for predetermining a minimum desirable engine speed ($ES_{MIN}$) and wherein said inputs include a signal indicative of current engine speed (ES) and said override conditions include current engine speed being less than said minimum desirable engine speed ($ES<ES_{MIN}$).

9. The system of claim 8 wherein said central processing unit additionally comprises means for predetermining a maximum desirable engine speed ($ES_{MAX}$) and wherein said override conditions additionally include current engine speed exceeding said maximum desirable engine speed ($ES<ES_{MIN}$ or $ES>ES_{MAX}$).

10. The system of claim 6 wherein said vehicle is equipped with a cruise control system having a selectable resume mode of operation for causing the vehicle to return to a preselected road speed, and wherein said override conditions comprises sensing operation of said cruise control system in the resume mode of operation thereof.

* * * * *